United States Patent
Pien et al.

(10) Patent No.: US 8,313,870 B2
(45) Date of Patent: Nov. 20, 2012

(54) INTEGRATED FLOW FIELD (IFF) STRUCTURE

(75) Inventors: Shyhing M. Pien, Acton, MA (US); Marvin Warshay, Shaker Heights, OH (US)

(73) Assignee: ElectroChem, Inc., Woburn, MA (US)

( * ) Notice: Subject to any disclaimer, the term of this patent is extended or adjusted under 35 U.S.C. 154(b) by 967 days.

(21) Appl. No.: 12/262,975

(22) Filed: Oct. 31, 2008

(65) Prior Publication Data
US 2009/0136789 A1 May 28, 2009

Related U.S. Application Data

(60) Provisional application No. 60/984,097, filed on Oct. 31, 2007.

(51) Int. Cl.
*H01M 8/04* (2006.01)
(52) U.S. Cl. .......... 429/429; 429/428; 429/400
(58) Field of Classification Search ............ 429/429
See application file for complete search history.

(56) References Cited

U.S. PATENT DOCUMENTS

| | | | |
|---|---|---|---|
| 5,322,744 | A | 6/1994 | Koseki et al. |
| 5,641,586 | A | 6/1997 | Wilson |
| 5,840,414 | A | 11/1998 | Bett et al. |
| 6,197,442 | B1 | 3/2001 | Gorman |
| 2005/0208366 | A1 | 9/2005 | Rohwer et al. |
| 2006/0199061 | A1* | 9/2006 | Fiebig et al. .......... 429/32 |
| 2006/0286429 | A1 | 12/2006 | Shiepe et al. |

FOREIGN PATENT DOCUMENTS

| KR | 10-2007-0023219 | 2/2007 |
|---|---|---|
| WO | WO-03/058743 | 7/2003 |

OTHER PUBLICATIONS

International Search Report dated Jul. 29, 2009 from PCT/US2008/082099.

* cited by examiner

*Primary Examiner* — Raymond Alejandro
*Assistant Examiner* — Gary Harris
(74) *Attorney, Agent, or Firm* — Foley Hoag LLP

(57) ABSTRACT

The present disclosure relates in part to a flow field structure comprising a hydrophilic part and a hydrophobic part communicably attached to each other via a connecting interface. The present disclosure further relates to electrochemical cells comprising the aforementioned flow fields.

15 Claims, 8 Drawing Sheets

Figure 9
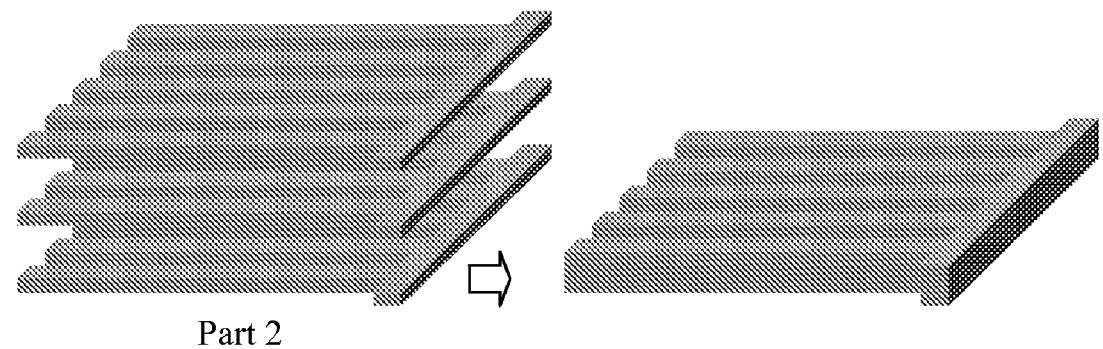
Part 2
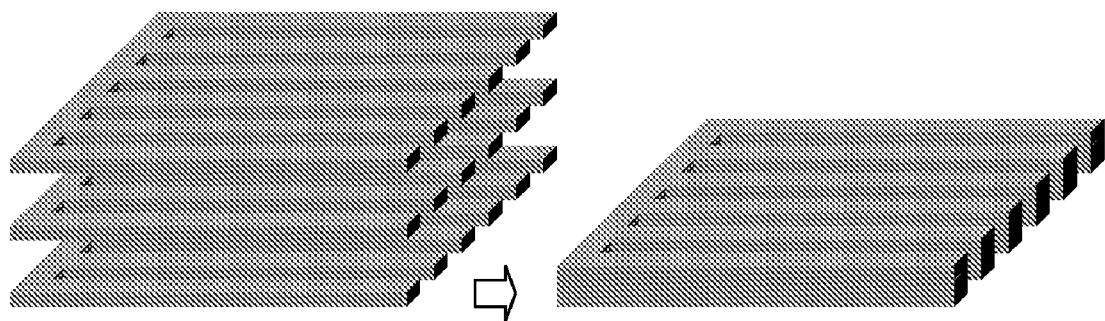
Part 3
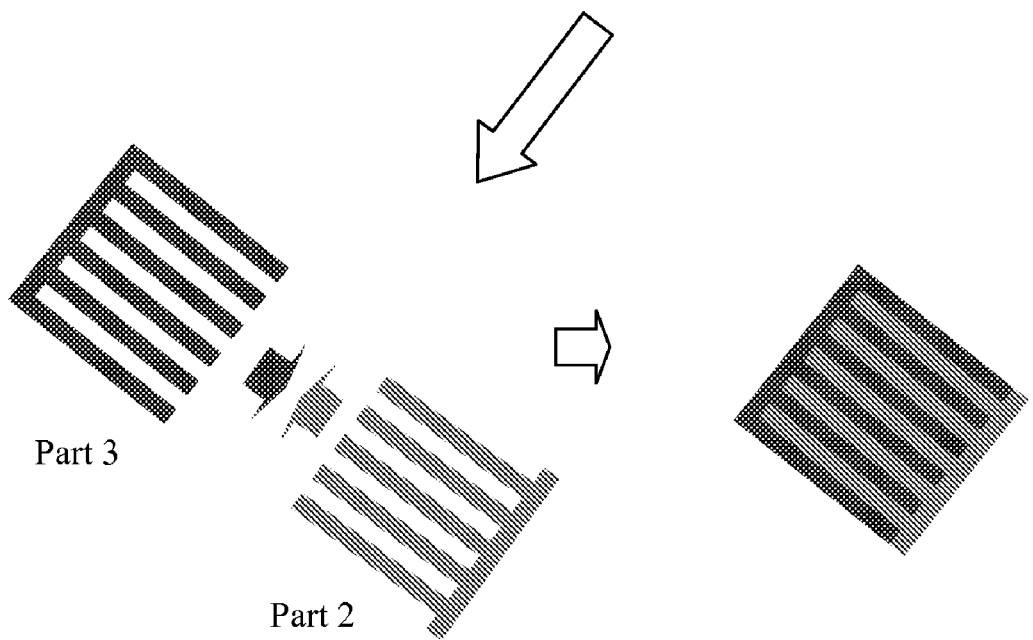
Part 3
Part 2

Figure 10

Porous channels designed to direct water and vapor.
(with two possible arrangements)

2-A arrangement – same properties

Hydrophilic

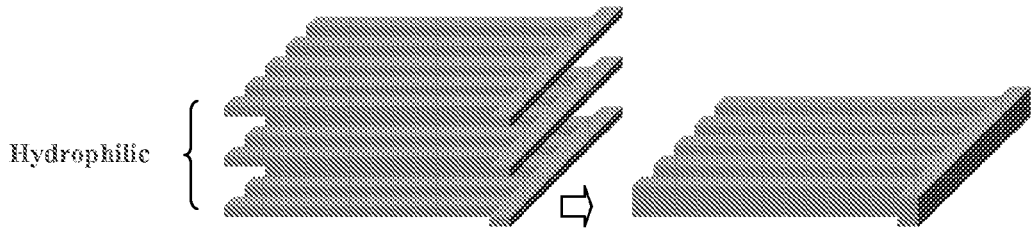

2-B arrangement – alternate properties

Hydrophilic —
hydrophobic —
Hydrophilic —

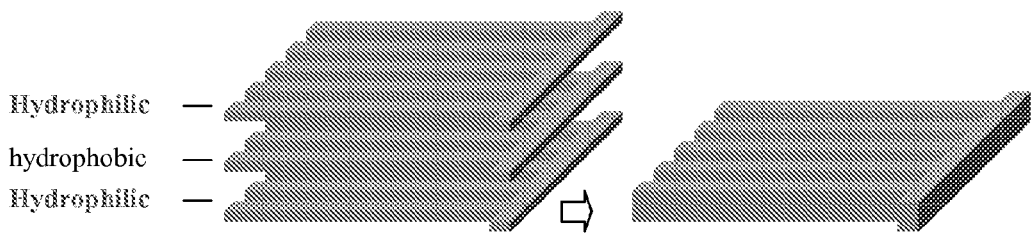

Porous channels designed to direct reactant gas and water vapor.
(with two possible arrangements)

3-A arrangement – same properties hydrophobi

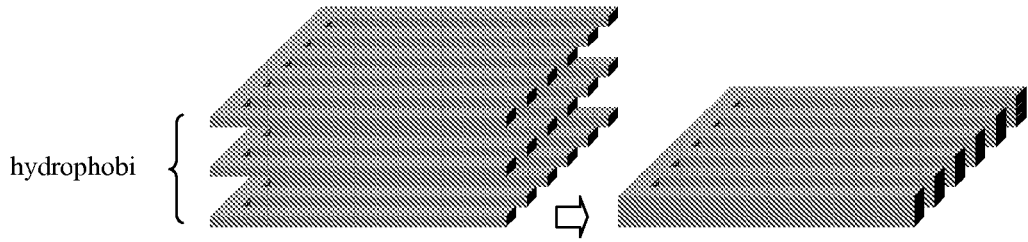

3-B arrangement – alternate properties hydrophobic —
Hydrophilic —
hydrophobic —

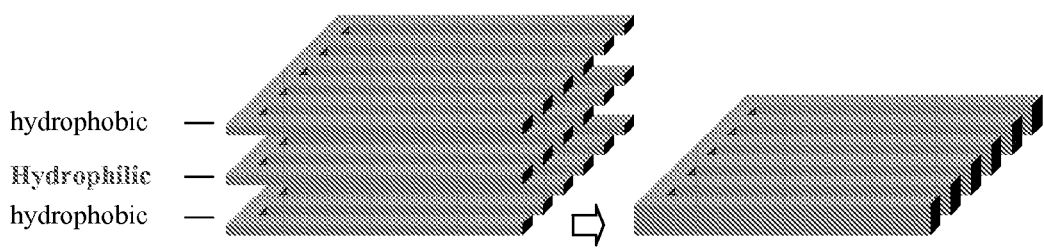

INTEGRATED FLOW FIELD (IFF) STRUCTURE

RELATED APPLICATIONS

This application claims the benefit of priority to U.S. Provisional Patent Application No. 60/984,097, filed on Oct. 31, 2007, which is herein incorporated by reference in its entirety.

GOVERNMENT SUPPORT

This invention was made with Government support under NASA SBIR Contract Nos. NNJ06JD71C and NNJ07A10C awarded by the National Aeronautics and Space Administration (NASA). The Government may have certain rights in the subject invention.

BACKGROUND

A flow field is a configuration that is specifically designed to distribute gas, liquid, vapor, or a combination thereof. A flow field is usually confined inside a compartment, and the compartment defines the boundary of the flow field and provides one or more access points to the flow field for the introduction of reactants and removal of byproducts. Flow fields are often used in connection with electrochemical cells.

Electrochemical cells operate by reacting with the reactants and producing electrons generating current and potential. A typical electrochemical cell consists of electrodes separated by a layer of electrolyte. The electrodes can be defined as anode and cathode electrodes or working and counter electrodes. A separate reference electrode can also introduce to the electrochemical cell. Gas that comes in contact with the electrodes first passes through an opening flow field (or channels) then diffuses through a barrier of the electrode and eventually reacts at the surface of the electrode involving either an oxidation or reduction reaction mechanism. These reactions are catalyzed by the electrode materials specifically developed for the reactants of interest.

For example, an electrochemical fuel cell specific to hydrogen and oxygen has an anode and cathode electrodes. The anode electrode produces electrons and protons for the oxidation of hydrogen at the anode. During a simultaneous reduction of the cathode, the electrons generated at the anode release and travel via an external circuit to the cathode where oxygen molecules consume the electrons (reduced) and form water by further combining the protons which travel via the electrolyte layer. The electrochemical fuel cell has been developed to convert fuel (hydrogen, alcohols such as methanol or ethanol, hydrocarbon, carbon oxides) and oxidant (such as oxygen, air) to generate electric energy; in other words, they convert the free energy of reaction of a fuel with an oxidant without degrading it completely to thermal energy. This conversion is achieved through the electrochemical oxidation of the fuel at the anode, with the consequent release of electrons and protons, while the oxidant is reduced at the cathode. The migration of the protons from the anode to the cathode compartment of the cell takes place through a suitable electrolyte.

When a solid polymer electrolyte is applied in electrochemical cells, such as polymer electrolyte membrane fuel cells (PEM fuel cells), the integration of the anode electrode, cathode electrode and electrolyte layer forms a membrane electrode assembly (MEA). Oxidation and reduction reaction occurred at the electrodes. The formed protons permeate through the polymer electrolyte membrane. The formed electrons travel along an external load circuit to create the current output of the fuel cell.

In a reverse process, electrolysis, which is commonly carried out in an electrolyzer, the liquid water (e.g., the product of the fuel cell) is converted back to the reactant gases (e.g., hydrogen and oxygen useable by the fuel cell). When the fuel cell and electrolyzer are operated in concert as two separate electrochemical cells or as a single electrochemical energy storage unit it is commonly called a regenerative fuel cell ("RFC"). Furthermore, a single electrochemical energy storage unit is commonly called a Unitized RFC to indicate that both the fuel cell process and the electrolysis process are carried out during different cycles within a single electrochemical cell.

Fuel cells utilizing a polymer electrolyte membrane (PEM) are typically configured in cell stacks having separator plates between adjacent membrane electrolyte assemblies (MEAs). On each side of the polymer electrolyte membrane, there is an electrode. One side is the anode electrode and another side is the cathode electrode. The separator plates and polymer electrolyte membranes keep the reactants separated between the anode and cathode of the electrochemical fuel cells. Flow fields (that are usually part of the separator plates) direct the reactants to the electrodes. The flow fields also direct the products out of the cells.

Fuel cells are considered to be an excellent alternative to the traditional systems of electric generation, mostly due to the extremely favorable environmental impact (absence of noxious emissions and noise, release of water as by-product). They can be used both in the field of stationary power generation of various size (electric plants, continuity or emergency power generators, etc.) as well as in the field of mobile applications (electric automotive applications, generation of automotive energy or auxiliary energy for space, submarine and naval applications).

Electrochemical cells, such as fuel cells and electrolyzers, have inherent problems associated with the changes of phase that occur in the cell when, upon reaction, gaseous reactants are converted to water or water vapor (in fuel cells) or the reactant water to oxygen and hydrogen gases (in electrolyzers). After some of the reactants have been converted to product, they must be directed away from the electrode catalytic reaction sites to avoid blocking access to these sites to the unreacted reactants. The undesirable condition called "flooding" can occur when product water blocks reactant access to the electrode catalytic reaction sites. The undesirable condition called "dryout" can occurs in the electrolyte layer when large amounts of dry reactant gas are introduced in the fuel cell. Thus, water management in fuel cells is complicated by two seemingly conflicting requirements associated with two vital elements of the system: the proton exchange membrane must be kept sufficiently hydrated in order to avoid dry out effectively conduct protons. At the same time, the catalytic sites on which the two half-reactions take place must be continuously supplied with gaseous reactants and kept relatively dry in order to efficiently proceed with the catalytic reaction.

Flow fields are used in electrochemical cells to attempt to resolve some of these issues, but with certain drawbacks. Flow fields are typically fabricated in separator plates by machining flow fields into a solid sheet of material or by a molding process. The flow fields are made up of a series of channels or grooves that allow passage of gases and liquids. In order to conduct electrons through the electrochemical cells, these separator plates are typically made of graphitic carbon or a variety of metals. The central portion on the plate has a flow field machined into its surface. The flow field directs fluid flow across the surface of the electrode in many patterns. Around the perimeter of the flow field, the plate provides various manifolds for communicating fluids through the stack. In addition to usually providing a fluid flow field, a separator plate used in electrochemical cells collects and conducts electrons through contact between electrodes and the ridges, or lands, in the flow field.

In electrolyzer operation, a poor distribution of water reactant to the electrode electrocatalyst site occurs when gaseous product is trapped inside the flow channels. Current flow field designs comprising machined or molded channels in a hard plate, no matter how sophisticated in design, are inherently inefficient in directing the products away from the electrode catalytic reaction sites. Another inherent problem associated with PEM fuel cells is the formation of condensed water droplets in the gas distribution channels, which block gas flow in the channels and can cause severe operational problems, even cell failure, in conventional designs.

In a chemical sensor, proper flow of liquids and gas are needed for accurate detection of the presence of certain chemicals.

Thus, there is a need for a flow field structure, which provides more ideal conditions inside of electrochemical cell.

SUMMARY

Provided herein is an Integrated Flow Field (IFF) structure, comprising a hydrophobic part and a hydrophilic part in communication with each other via a connecting interface. The hydrophobic part and hydrophilic part comprise porous material and have a porosity of 30% to 100%. Preferably, the communication between the hydrophobic and hydrophilic parts is such that a liquid, vapor, a gas, or a mixture thereof, can flow between the hydrophilic and hydrophobic parts. In some embodiments, the flow field structure comprises a plurality of hydrophobic parts and a plurality of hydrophilic parts in communication with each other. In other embodiments the hydrophobic parts and hydrophilic parts are hydrophobic channels and hydrophilic channels, respectively.

In some embodiments, the hydrophobic and hydrophilic channels comprise a porous material, wherein the porous material has a porosity of 30 to 100%.

In some embodiments, the hydrophobic channels and hydrophilic channels are provided in an alternating configuration. In other embodiments, the hydrophobic channels and hydrophilic channels are provided in a random configuration. In still other embodiments, the hydrophobic channels and hydrophilic channels are provided in an interlocking configuration.

In certain embodiments, the number of hydrophobic channels is equal to the number of hydrophilic channels. In other embodiments, the number of hydrophobic channels is greater than the number of hydrophilic channels. In other embodiments, the number of hydrophobic channels is less than the number of hydrophilic channels. In other embodiments, the flow field structure comprises 2 to 20 hydrophilic channels and 2 to 20 hydrophobic channels.

In some embodiments, each channel has a span to width ratio ranging from about 1/2 to about 1/10.

In some embodiments, the hydrophobic part and hydrophilic part comprise graphitic carbon fiber mat, fiber cloth, graphitic carbon paper, sintered metal, metal forms, mesh, screen, reticulated vitreous carbon, or a combination thereof. In other embodiments, the hydrophobic part and hydrophilic part comprise graphitic carbon paper, such as Toray® graphitic carbon. In some embodiments, the hydrophobic part comprises between about 5% to about 60% Teflon. In other embodiments, the hydrophilic part comprises between about 1 and 60% Nafion.

In some embodiments, the flow field structure further comprises a manifold in communication with the hydrophobic part or the hydrophilic part. In other embodiments, the flow field comprises a manifold in communication with the hydrophobic part and a manifold in communication with the hydrophilic part.

In some embodiments, the flow field structure is provided within a separator plate. In other embodiments, the flow field structure, which may or may not be provided in a separator plate, is provided in an electrochemical cell. The electrochemical cell may be a fuel cell, an electrolyzer, a regenerative fuel cell or a chemical sensor.

In other embodiments, the flow field structure is comprised within a separator plate for a fuel cell stack.

Another aspect of the invention relates to a subassembly for an electrochemical cell, comprising:
  (a) a membrane electrode assembly;
  (b) an electrode gas distribution layer;
  (c) a flow field structure comprising a hydrophobic part and a hydrophilic part in communication with each other via a porous interface;
  (d) a separator plate or frame;
  (e) an input manifold;
  (f) an output manifold;
  (g) a sublayer for humidifying input gas; and
  (h) an impermeable electronic conductive framework.

In other embodiments of the subassembly, the flow field structure is provided in the separator plate or frame. In some embodiments, the sublayer for humidifying gas comprises a porous material.

Another aspect of the invention relates to a fuel cell stack, comprising at least one of the aforementioned subassemblies.

Another aspect of the invention relates to a method for controlling fluid flow in an electrochemical cell comprising:
  a) providing an electrochemical cell comprising a flow field structure comprising a hydrophobic part and a hydrophilic part in communication with each other via a porous interface; an input manifold in communication with the hydrophobic part or the hydrophilic part; and an output manifold in communication with the hydrophobic or the hydrophilic part;
  b) introducing a liquid, vapor, gas, or mixture thereof into the electrochemical cell via the input manifold; and
  c) removing a the liquid, gas, vapor, or mixture thereof from the electrochemical cell via the output manifold.

In some embodiments, the liquid, gas, vapor, or mixture thereof introduced into the cell comprises $H_2$. In other embodiments, the liquid, gas, vapor, or mixture thereof removed from the electrochemical cell comprises water. In another embodiment the liquid, gas, vapor, or mixture thereof removed from the cell comprises $H_2$.

Further objectives and advantages of the present invention will become apparent as the description proceeds. To gain a full appreciation of the scope of the present invention, it will be further recognized that various aspects of the present invention can be combined to make desirable embodiments of the invention.

BRIEF DESCRIPTION OF THE DRAWINGS

FIG. 2a depicts an embodiment, wherein the hydrophobic and hydrophilic parts are integrated in an ordered configuration. FIG. 2b depicts an embodiment wherein the hydrophobic and hydrophilic parts are integrated in an alternating configuration. FIG. 2c depicts an embodiment, wherein the hydrophobic and hydrophilic parts are integrated in a random configuration.

FIG. 9 depicts alternative ways of arranging the two interdigitating parts of a integrated flow field of the invention.

FIG. 10 depicts alternative ways of arranging the two interdigitating parts of an integrated flow field of the invention.

DETAILED DESCRIPTION

Unless defined otherwise, all technical and scientific terms used herein have the same meaning as commonly understood by one of ordinary skill in the art to which this invention belongs.

Figure 1:
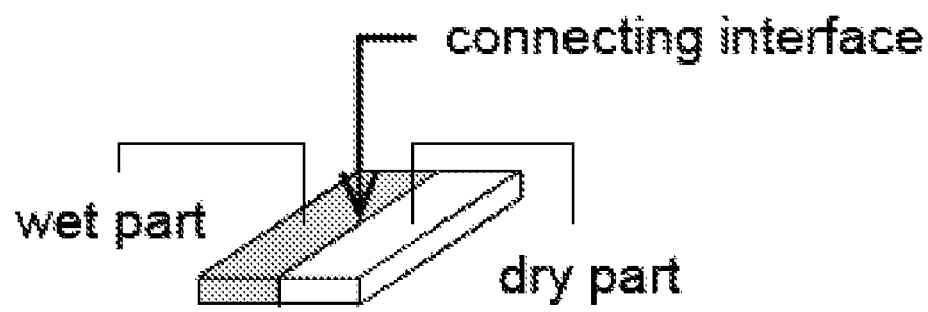
FIG. 1 depicts an embodiment of a flow field, comprising a hydrophobic part and a hydrophilic part, which is in communication via a connecting interface.

Provided herein is a flow field structure, comprising a hydrophobic part and a hydrophilic part in communication with each other via a porous interface. The porous interface may have a porosity of 30% to 100%. In other embodiments, the porous interface may have a porosity of 50 to 100%, 75 to 100%, 80 to 100% or about 85 to about 95%. As depicted in FIG. 1, the porous interface comprises the surfaces of the hydrophobic and/or hydrophilic parts in direct contact with each other. The hydrophobic and hydrophilic parts comprise a porous material. Thus, when the respective surfaces of the hydrophobic and/or hydrophilic parts are in contact with each other, the surfaces form a porous interface between the parts. Preferably, the communication between the hydrophobic and hydrophilic parts is such that a liquid, vapor, a gas, or a mixture thereof, can flow between the hydrophilic and hydrophobic parts. Thus, the flow field allows the separation of hydrophobic and hydrophilic fluids. The term fluid "fluid" encompasses both a gas, a liquid, a vapor, as well as a two-phase fluid (mixed liquid and vapor) and a supercritical fluid. The fluid may further contain suspended or entrained particles, or solutes. The hydrophobic fluids will tend to flow to the hydrophobic parts of the flow field, while the hydrophilic fluids will tend to flow to the hydrophilic parts of the flow field. In some embodiments, the flow field structure comprises a plurality of hydrophobic parts and a plurality of hydrophilic parts in communication with each other. The hydrophobic parts and hydrophilic parts may be hydrophobic channels and hydrophilic channels, respectively.

In some embodiments, the hydrophobic and hydrophilic channels comprise a porous material, wherein the porous material has a porosity of 30 to 100%. In other embodiments, the porosity is 50 to 100%, 75 to 100%, 80 to 100% or about 85 to about 95%

The parts or channels in the flow field may be provided in any configuration that advantageously directs the flow of fluids as needed for a particular application. In some embodiments, the hydrophobic channels and hydrophilic channels are provided in an alternating configuration. In other embodiments, the hydrophobic channels and hydrophilic channels are provided in a random configuration. In still other embodiments, the hydrophobic channels and hydrophilic channels are provided in an interlocking configuration. The channels also may be provided as interdigitating parts. In other embodiments, the hydrophobic and hydrophilic channels may be provided in a circular configuration, such as in a series of concentric circles, or they be provided in a coiled or serpentine configuration. The channels may further be provided as a single layer of channels arranged side by side, or they may be provided in a three-dimensional configuration, with channels in communication with each other in a side by side configuration as well as in a stacked configuration. (See, e.g., FIGS. 2-5.)

The flow field structure may comprise several hydrophobic and hydrophilic channels. In certain embodiments, the number of hydrophobic channels is equal to the number of hydrophilic channels. In other embodiments, the number of hydrophobic channels is greater than the number of hydrophilic channels. In other embodiments, the number of hydrophobic channels is less than the number of hydrophilic channels. In other embodiments, the flow field structure comprises 2 to 20 hydrophobic hydrophilic channels and 2 to 20 hydrophobic channels.

In some embodiments, each channel has a span to width ratio ranging from about 1/2 to about 1/10. In other embodiments, the span to width ratio is 1/3 to 1/10, 1/4 to 1/10 or 1/5 to 1/10.

The hydrophobic and hydrophilic parts preferably comprise an electroconductive porous material. The porous material may be provided in several layers, or sheets, and shaped into the desired shape for the hydrophobic and hydrophilic parts. The material comprising the porous layers may be any material with excellent wetting properties as well as other required electrochemical cell properties such as conductivity. Such conductive porous materials include, but are not limited to, graphitic carbon fiber mats, fiber cloth, graphitic carbon paper, sintered metal, metal forms, mesh, screen, reticulated vitreous carbon, and mixtures thereof. In some embodiments, the porous electroconductive material is graphitic carbon paper, such as Toray® graphitic carbon (e.g., TDP-H=120, TGP-H-090, TGP-H-060 or TGP-H-030).

In general, the porous materials may be further treated to enhance the hydrophobicity or hydrophilicity of the pores to facilitate gas transport or water transport, respectively, internally through the pores. The hydrophobic part preferably further comprises a hydrophobic material or a hydrophobic coating. Hydrophobic coatings include hydrophobic polymers, such as fluorinated, or perfluorinated polymers. Polytetrafluoroethylene (Teflon) is an example of one such polymer. The hydrophobic part may be coated with about 1% to about 70% of a hydrophobic coating, and preferably between about 5% to about 60% hydrophobic coating. In some embodiments, the hydrophobic part comprises between about 10 to 60% hydrophobic coating, or about 30 to 60% hydrophobic coating. In other embodiments, the hydrophobic part comprises about 5, 10, 20, 30, 40, 50, or 60% hydrophobic coating. The aforementioned hydrophobic coating may be Teflon. The hydrophilic part preferably further comprises a hydrophilic coating, such as a hydrophilic or ionic polymer. Sulfonated polymers, such as sulfonated polytetrafluoroethylene (Nafion) is an example of a hydrophilic polymer useful as a hydrophilic coating. The hydrophilic part may comprise 1 to 70% hydrophilic coating, for example 1 to 50%, 1 to 25% or 1 to 10% hydrophilic coating. In other embodiments, the hydrophilic part comprises 1, 2, 3, 4, 5, 6, 7, 8, 9, 10, 11, 12, 13, 14, or 15% hydrophilic coating. In some embodiments, the hydrophilic coating is Nafion.

The flow field may further comprise manifolds for introducing and removing fluids from the structure. For example, the manifold may be in communication with the hydrophobic part or the hydrophilic part. In other embodiments, the flow field comprises a manifold in communication with the hydrophobic part and a manifold in communication with the hydrophilic part. The manifolds may comprise an electroconductive material, such as the aforementioned graphitic carbon paper, and may be coated with the aforementioned hydrophilic or hydrophobic coatings.

The aforementioned IFF may be used in any application where the separation of gas, vapor, liquid or mixtures thereof is needed. In some embodiments, the flow field structure is provided within a separator plate. In other embodiments, the flow field structure, which may or may not be provided in a separator plate, is provided in an electrochemical cell. The electrochemical cell may be a fuel cell, an electrolyzer, a regenerative fuel cell or a chemical sensor.

In other embodiments, the flow field structure is comprised within a separator plate for a fuel cell stack.

Another aspect of the invention relates to a subassembly for an electrochemical cell, comprising:
  (a) a membrane electrode assembly;
  (b) an electrode gas distribution layer;
  (c) a flow field structure comprising a hydrophobic part and a hydrophilic part in communication with each other via a porous interface;
  (d) a separator plate or frame;
  (e) an input manifold;
  (f) an output manifold;
  (g) a sublayer for humidifying input gas; and
  (h) an impermeable electronic conductive framework.

In other embodiments of the subassembly, the flow field structure is provided in the separator plate or frame. In some embodiments, the sublayer for humidifying gas comprises a porous material.

Another aspect of the invention relates to a fuel cell stack, comprising at least one of the aforementioned subassemblies.

Another aspect of the invention relates to a method for controlling fluid flow in an electrochemical cell comprising:
  a) providing an electrochemical cell comprising a flow field structure comprising a hydrophobic part and a hydrophilic part in communication with each other via a porous interface; an input manifold in communication with the hydrophobic part or the hydrophilic part; and an output manifold in communication with the hydrophobic or the hydrophilic part;
  b) introducing a liquid, vapor, gas, or mixture thereof into the electrochemical cell via the input manifold; and
  c) removing a the liquid, gas, vapor, or mixture thereof from the electrochemical cell via the output manifold.

In some embodiments, the liquid, gas, vapor, or mixture thereof introduced into the cell comprises $H_2$. In other embodiments, the liquid, gas, vapor, or mixture thereof removed from the electrochemical comprises water. In another embodiment the liquid, gas, vapor, or mixture thereof removed from the cell comprises $H_2$.

In some embodiments, a gas introduced into the flow field in order to remove a fluid from the hydrophobic or hydrophilic part. For example, the gas introduced into the flow field creates additional flow to force a fluid out of the flow field.

In some embodiments, the flow field, the subassembly and the method is used in an electrochemical cell such as a PEM fuel cell, electrolyzer, RFC, or chemical sensor. Rather than having conventional machined or molded flow channels directing the flow of the incoming reactants, outgoing products and excess reactants, the aforementioned flow field structures described herein have arrangements of porous hydrophobic and hydrophilic channels that are used for both the anode and cathode flow fields, e.g., in the separator plates. In some embodiments, the flow fields are formed in separator plates.

The flow field structures may be used in electrochemical cells involving two phases: gas and liquid (or vapor) transfer and reaction in the electrochemical cells. The flow field structures described herein reduce or eliminate the risk of "flooding" and "dryout" conditions that commonly occur in electrochemical cells which operate with conventional flow fields. This is because the flow field separately controls the flow of liquid and gases via the porous hydrophobic and hydrophilic channels for gases and liquids respectively. In the hydrophobic porous channels, water is expelled and convection gradients are induced to control the flow of gases.

To reduce flow impedance and improve efficiency in a PEM fuel cell, the basic flow field structure comprises porous hydrophilic channels to facilitate the movement of liquid (e.g., the product water) away from the electrode reaction sites; flow field porous hydrophobic channels direct each of the reactant gases (e.g. hydrogen gas) from its manifold to its electrode. To improve efficiency in a reversed fuel cell, water electrolyzer mode, the flow field porous hydrophobic channels direct the hydrogen and oxygen product gases from the electrode reaction sites; flow field porous hydrophilic channels direct the liquid water reactant from its manifold to the electrode reaction sites. In addition, the flow field inserts a hydrophilic layer between the flow field and separator plate which provides passages that move liquid from porous hydrophobic channels to porous hydrophilic channels (preventing local flooding) and to provide wicking for interspersed water distribution (preventing local dryness and also clearing condensed water droplets effectively and safely).

Thus, the multilayered integrated flow field structures described herein provide effective fuel, oxidant, liquid water and water vapor flow control in electrochemical cells. Beneficial results of the integrated flow field structures include higher voltage efficiency, increased gas utilization, higher operational stability, and lower excess gas circulation rates required to maintain stable operation. The flow field design has no sharp edges or sharp screens (unlike conventional fuel cell and electrolyzer designs) which makes it very amenable to high pressure operation. Thus, with the integrated flow field, the performance benefits of high pressure can be achieved without also running the risk of the high pressure, causing cell failure from sharp edges (in conventional designs) cutting through the MEA. High pressure operation is especially important for a commercial electrolyzer. Another unique benefit of the flow field when used in an electrolyzer is that it separates the excess water from the product gases within the electrolyzer. Because the integrated flow field structures can function in any orientation, the integrated flow field structures may be used in aerospace applications. Furthermore, lighter weight PEM electrochemical power or energy storage systems may be produced using the integrated flow field structures due to (1) the lower amounts of reactants required at the higher voltage efficiencies that are produced using cells incorporating the integrated flow field structures and (2) the fact that integrated flow field plates are lighter than conventional plates.

The integrated flow field structures of porous hydrophilic and hydrophobic channels are created by cutting sections out of hydrophilic and hydrophobic porous materials, to create the hydrophilic and hydrophobic parts, arranging them properly in a plate or framework, and compressing them. The framework is impermeable to gases and is electronically conductive.

Figure 2:
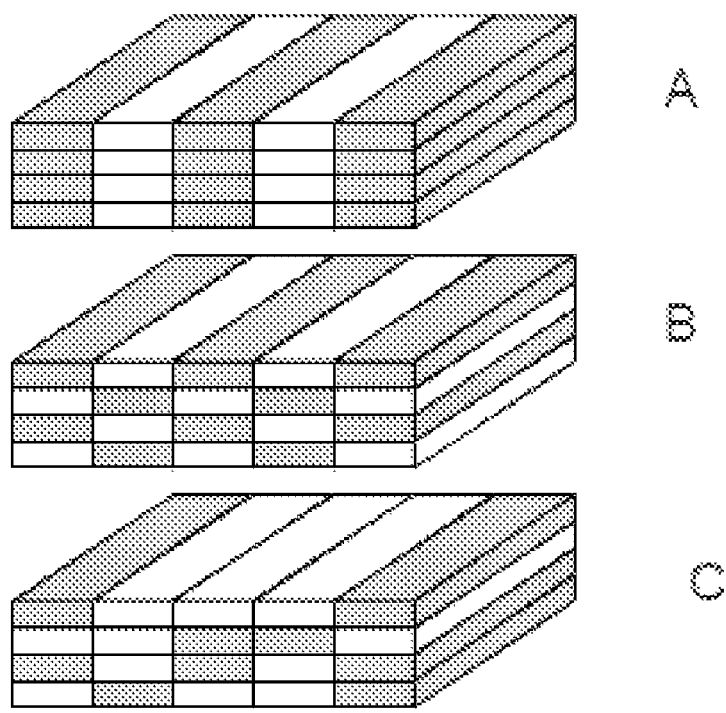
FIG. 2 depicts various ways of integrating a multiplicity of hydrophobic parts and hydrophilic parts in accordance with the present invention.
Figure 3:
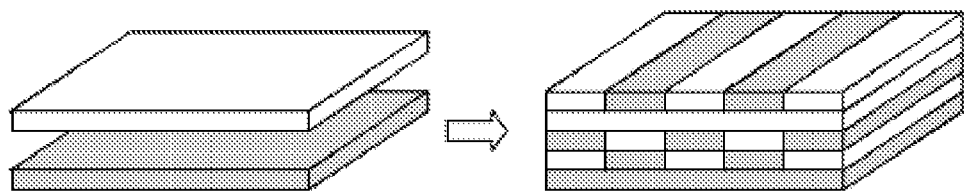
FIG. 3 depicts how the hydrophobic and hydrophilic parts can be integrated to create a connecting interface between the hydrophobic and hydrophilic parts.
Figure 4:
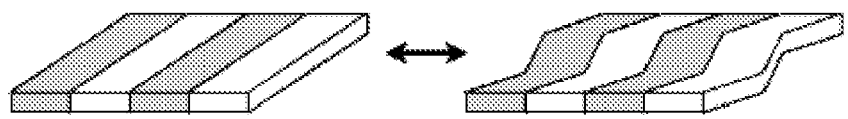
FIG. 4 depicts alternate shapes and patterns for integrating the hydrophobic and hydrophilic parts in order to increase the mixing between the two parts and to provide interlocking features.
Figure 5:
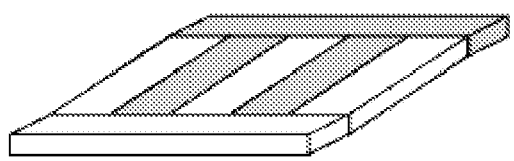
FIG. 5 depicts an integrated flow field structure provided with manifolds for introducing to and removing from the flow field fluids, vapors, gases, or mixtures thereof.
Figure 6:
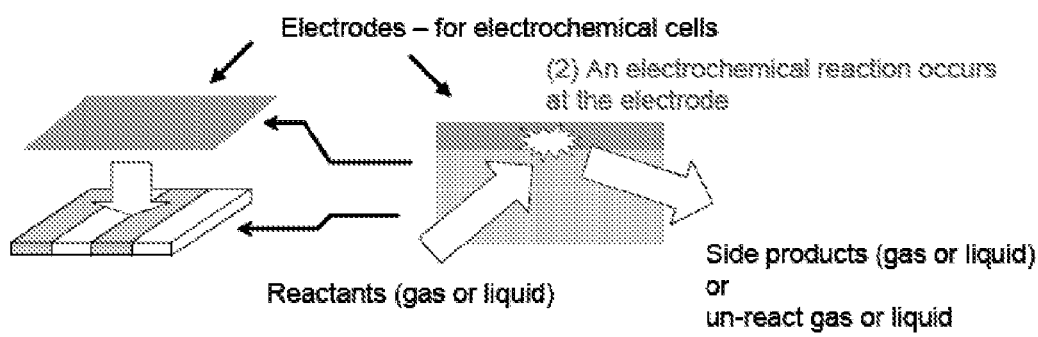
FIG. 6 depicts the operation of an electrochemical cell with an integrated flow field structure of the present invention. The integrated flow field structure depicted thus provides channels for simultaneously introducing gas, liquid or vapor reactants into the cell, and removing gas, liquid or vapor reaction products out of the cell.
Figure 7:
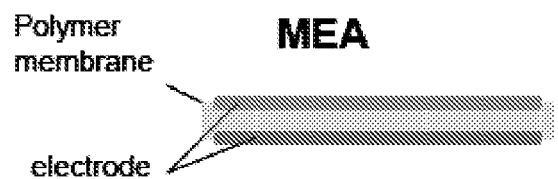
FIG. 7 depicts a membrane electrode assembly, wherein the electrode contacts the integrated flow field.
Figure 11:
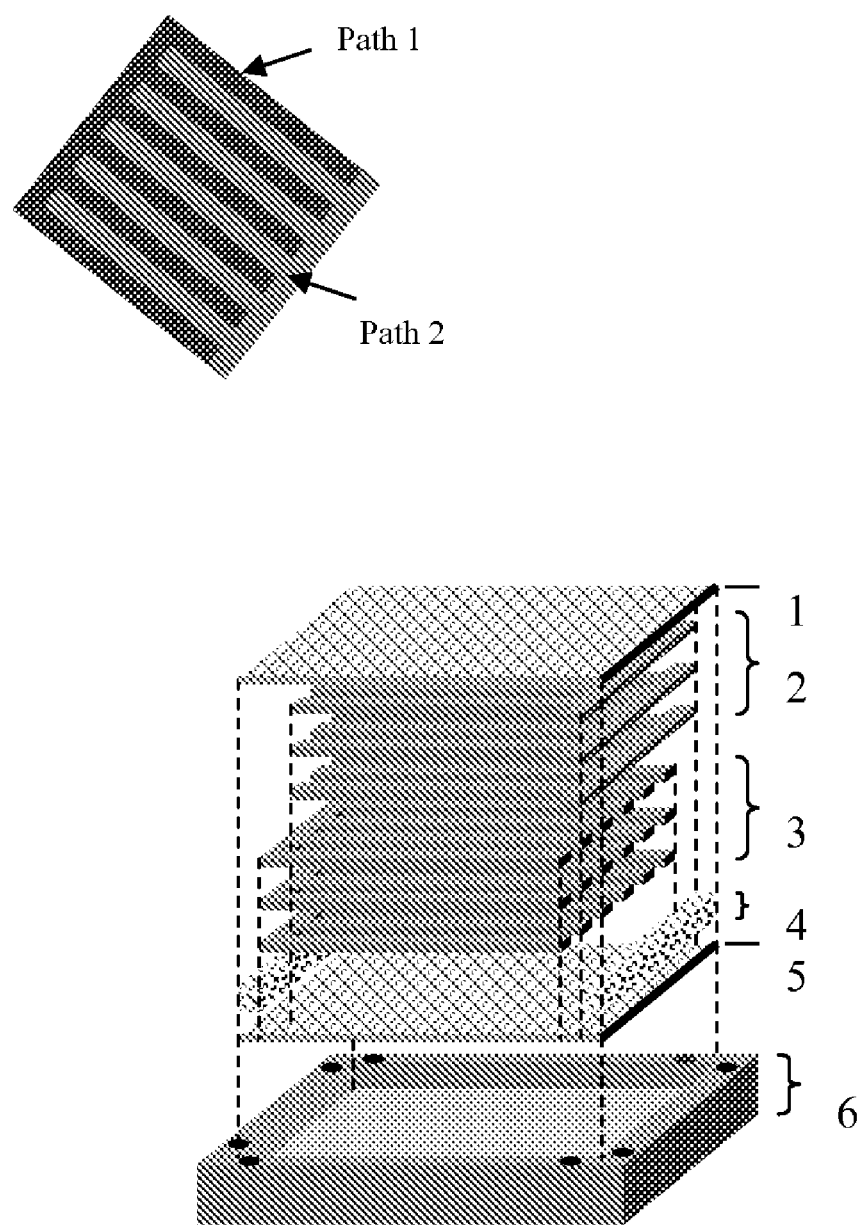
FIG. 11 depicts an integrated flow field separator plate design illustrated in a half cell.

FIG. 11 illustrates an exemplary method for assembling one embodiment of an integrated flow field. Prior to assembly, the layers used to create each of the two interdigitated opposing parts each shaped into a plurality of flow channels are cut out from each of the hydrophilic and hydrophobic porous materials, respectively. For example, three hydrophilic layers are cut and stacked into a hydrophilic porous multilayer part (2), and three hydrophobic layers are cut and stacked into a hydrophobic porous multilayer part (3). Upon proper placement and compression into a plate or framework (6 in FIGS. 8 and 11), part 2 and part 3 nest into each other to form the IFF unit cell and create the hydrophilic and hydrophobic porous channels. The lower portion of FIG. 2 illustrates the interdigitation of parts 2 and 3 to form a IFF unit cell.

FIGS. 2 to 5 depict non-limiting examples of the possible configurations of hydrophobic and hydrophilic parts to create a flow field of the present invention. FIGS. 9 and 10 illustrate alternative embodiments for stacking the layers of hydrophilic and hydrophobic material to create interdigitating parts 2 and 3. The alternate arrangement shown in cases 2B and 3B provides an alternate way of directing the flow of water and vapor and reactant gas and water vapor through the flow field channels by allowing parts 2 and 3 to have alternating hydrophilic and hydrophobic layers.

Figure 8:
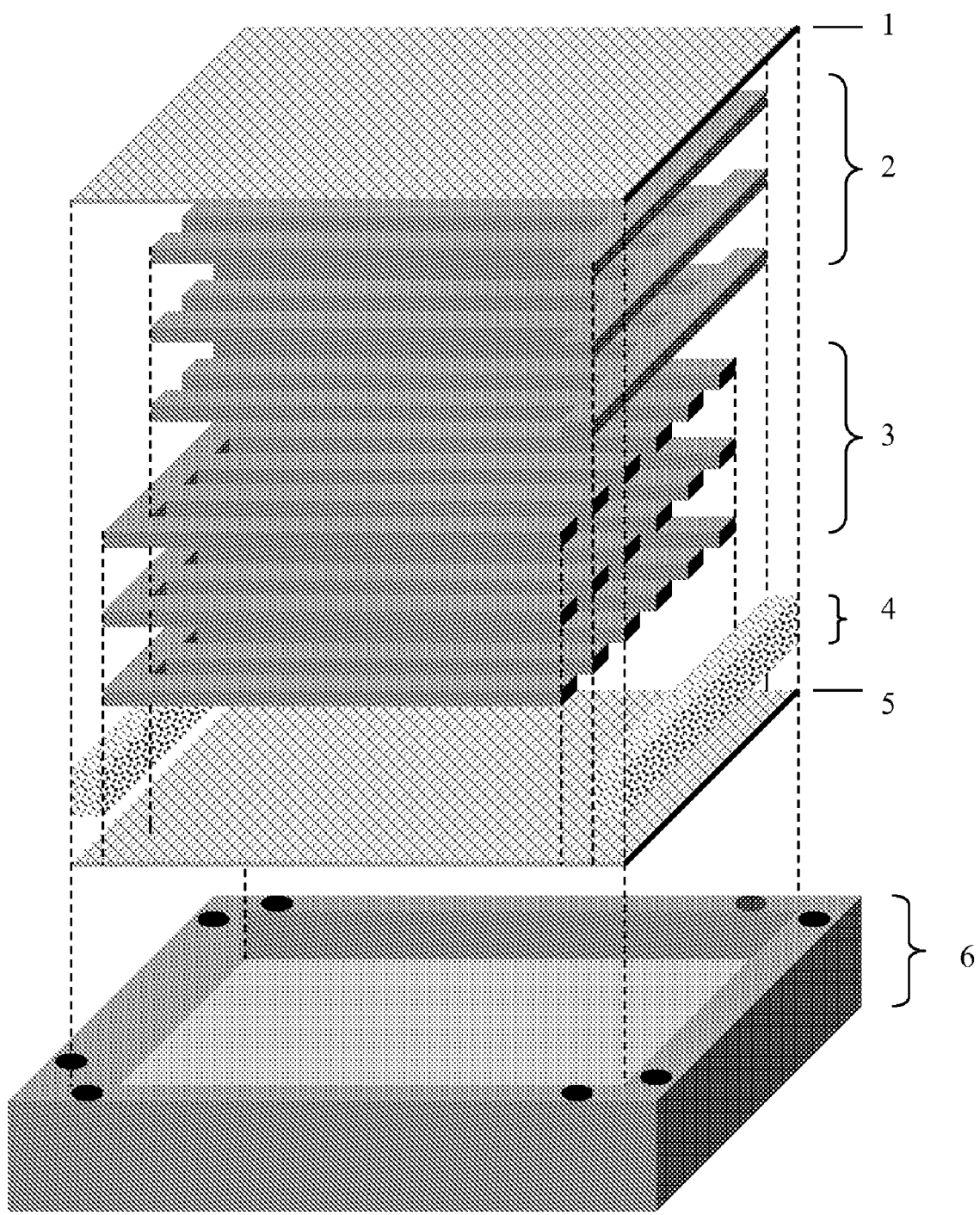
FIG. 8 depicts an embodiment of an integrated flow field structure assembly, wherein the hydrophobic and hydrophilic parts are provided as interdigitating channels.

In certain embodiments, the IFF structures may comprise a separator plate, e.g., for use in a fuel cell stack. For example, the two interdigitated opposing parts each shaped into a plurality of flow channels may be assembled using several layers to create an IFF separator plate as illustrated in FIG. 8. The nested multilayer structure is placed in a framework (6) of the IFF plate. The framework is impermeable to gases, that is, it does not allow reactants to flow between anode and cathode. The material of the framework may be any material that is electrochemically stable and electronically conductive, allowing the electrons to flow through the cells without material deterioration.

Specifically, referring to FIG. 8, the design of an integrated flow field may be divided into four major sections, comprising an input manifold (4), an output manifold (4) and multilayer gas flow and water flow fields (2 and 3). All sections are made of porous materials that establish the basic passages with opened structures. The porous material in the input and output manifold sections have larger pore sizes in order to produce uniform gas and water distribution and ease mass transport across the porous media. The multilayer flow field sections (2 and 3) are made with different wetting properties that establish divided hydrophobic and hydrophilic channels.

Unlike the input and output manifold, the gas and water flow fields are comprised of a multilayer structure made of porous sheets. In addition, a thin layer of hydrophilic porous material may be placed under the four sections (5) with the aim of directing water across the flow field area and transferring water to the input manifold. Using this approach, the integrated flow field allows most of the reactant gas and vapor transfer by convection flow while the liquid water is removed through the water flow field via a wicking action.

Thus, further provided is a subassembly for a fuel cell, comprising: (a) a membrane electrode assembly; (b) an electrode gas distribution layer; (c) a flow field comprised of two interdigitated opposing parts each shaped into a plurality of flow channels, wherein each part is comprised of an equal number of porous layers that may be either hydrophobic or hydrophilic, such that, when the parts are interdigitated, the hydrophobic porous layers of one part are interdigitated with the hydrophilic porous layers of the other part; (d) an input manifold; (e) an output manifold; (f) a sublayer for humidifying input gas; and (h) an impermeable electronic conductive framework.

The subassemblies may be incorporated into a variety of fuel cell designs, as would be ascertainable to one of skill given a particular application.

Figure 12:
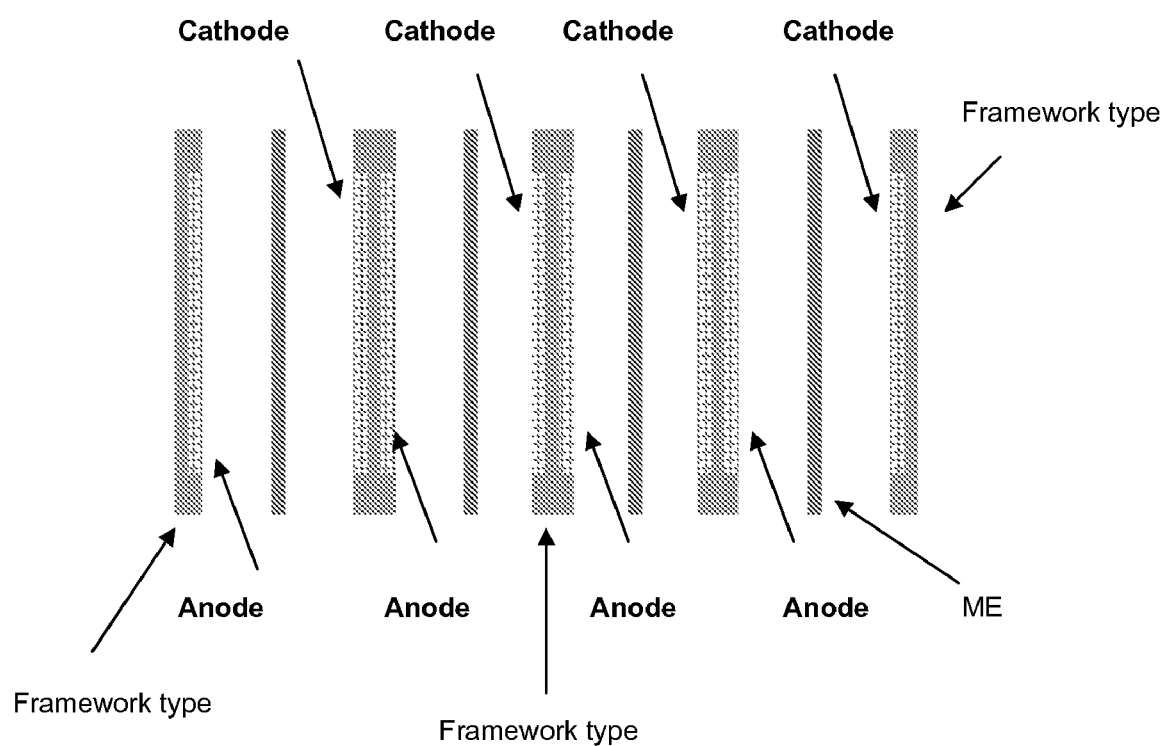
FIG. 12 depicts an exemplary integrated fuel cell stack configuration.

Further provided is a fuel cell stack, comprising at least one subassembly for a fuel cell as described above. Fuel cell stacks typically comprise an aligned assembly of fuel cells connected together mechanically and electrically in series to obtain desired voltage and power output. Typically, in any such stack, one side of a given separator plate is the anode plate for one cell, and the other side of the separator plate is the cathode plate for the adjacent cell, and so on seriatim. FIG. 12 depicts an exemplary fuel cell stack configuration for the separator plates described herein.

The integrated flow field structures provided herein may be incorporated into any electrochemical cell design. The electrochemical cells can be, but are not limited to, fuel cells of the following types: PEM hydrogen/oxygen (or air), PEM reformate/oxygen (or air), PEM alcohol/oxygen (or air), PEM hydrocarbon/oxygen (air); or PEM electrolyzer cells. The flow fields may further be used in chemical sensors, for example, sensor used to detect carbon monoxide or other gases.

The guiding philosophy for the integrated flow field performing in either fuel cells or electrolyzers is the same, that is, the flow of liquids and gases have to be separately controlled at the same time. The integrated flow field of the present invention segregates, or channels, the liquid and gaseous flows. This is not possible in conventional flow fields.

In a water electrolyzer, oxygen and the hydrogen product gases are drawn away from the liquid water that is reacting at the electrode catalyst sites via the hydrophobic channels. In the hydrophobic channels, water is expelled and convection gradients are induced to control the flow of gases. The water reactant is brought to the electrode sites via the flow field hydrophilic channels.

In a fuel cell, the liquid product water is drawn away from the oxygen and hydrogen reactant gases via the flow field hydrophilic channels, while the reactant gases (e.g. $H_2$) are brought to the electrode sites via the flow field hydrophobic channels. Or, in a PEM alcohol/oxygen (or air) fuel cell, liquid alcohol is brought to the electrode sites via the flow field hydrophilic channels, while the gas product $CO_2$ is drawn away from the electrode site via flow field hydrophobic channels.

In both the electrolyzer and the fuel cell, the products of reaction are continuously removed from the electrode reaction sites by the flow field, thus preventing them from blocking the incoming reactants (water in the case of the water electrolyzer).

The use of the integrated flow field produces an additional benefit when used in a water electrolyzer. Since considerable excess water is used in the electrolyzer, the hydrogen and oxygen product gases flow out of the conventional electrolyzer containing a great amount of water. To be able to use the product hydrogen and oxygen gases, complex and costly water-gas separation is performed outside the electrolyzer. By contrast, this is not required when the presently described integrated flow field electrolyzer is used because the flow field continuously separates the product gases from water.

Finally, for most applications, the integrated flow field fuel cell and the integrated flow field electrolyzer designs will not be identical. In cell and stack design, including materials, they will be designed to reflect the somewhat different conditions under which the fuel cell and electrolyzer operate, e.g. pressure, temperature, current density, voltages, flows, etc.

A unitized RFC uses the same electrochemical unit for electrolyzer and fuel cell operation. Thus, the Unitized RFC electrochemical system would be optimized for either system weight or volume. Typically, this is useful in energy storage systems operating in outer space.

EXEMPLIFICATION

The invention, having been generally described, may be more readily understood by reference to the following examples, which are included merely for purposes of illustration of certain aspects and embodiments of the present invention, and are not intended to limit the invention in any way. All headings are for the convenience of the reader and should not be used to limit the meaning of the text that follows the heading, unless so specified.

Example 1

IFF Separator Plate Constructed from Graphitic Carbon

Porous material flow fields were constructed using layers of Toray® graphitic carbon, specifically TGP-H-120, TGP-H-090, TGP-H-060 and TGP-H-030. The hydrophilic layers are used as received or pre-treated with hydrophilic reagents (such as Nafion contained about 5%). The hydrophobic layers are pre-treated with hydrophobic reagents (such as Teflon contained about 30%). The span-to-width ratio was 1/4. The flow field comprised 5 layers of hydrophilic and hydrophobic parts. The sublayer of a hydrophilic layer favoring humidifying input gas is made of one layer of complete hydrophilic layer. The flow fields of this Example were constructed using the assembly procedure shown in FIG. 8.

EQUIVALENTS

Those skilled in the art will recognize, or be able to ascertain using no more than routine experimentation, many equivalents to the specific embodiments of the invention described herein. While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations. Such equivalents are intended to be encompassed by the following claims.

We claim:

1. An integrated flow field structure comprising a plurality of hydrophobic channels and a plurality of hydrophilic channels in communication with each other via porous interfaces, wherein the integrated flow field structure is incorporated into a subassembly of an electrochemical cell, wherein at least some of the hydrophobic and hydrophilic channels are in an interlocking configuration and each channel has a span to width ratio ranging from about 0.5 to about 0.1.

2. The integrated flow field structure of claim 1, wherein the porous interface has a porosity of 30% to 100%.

3. The integrated flow field structure of claim 1, wherein the hydrophobic and hydrophilic channels comprise a porous material.

4. The integrated flow field structure of claim 3, wherein the porous material has a porosity of 30 to 100%.

5. The integrated flow field structure of claim 1, wherein the hydrophobic channels and hydrophilic channels are provided in an alternating configuration.

6. The integrated flow field structure of claim 1, wherein the hydrophobic channels and hydrophilic channels are provided in a random configuration.

7. The integrated flow field structure of claim 1, wherein the number of hydrophobic channels is equal to the number of hydrophilic channels.

8. The flow field structure of claim 1, wherein the number of hydrophobic channels is greater than the number of hydrophilic channels.

9. The integrated flow field structure of claim 1, wherein the number of hydrophobic channels is less than the number of hydrophilic channels.

10. The integrated flow field structure of claim 1, comprising 2 to 20 hydrophobic channels and 2 to 20 hydrophilic channels.

11. The integrated flow field structure of claim 1, wherein the hydrophobic channels and hydrophilic channels comprise graphitic carbon fiber mat, fiber cloth, graphitic carbon paper, sintered metal, metal forms, mesh, screen, reticulated vitreous carbon, or a combination thereof.

12. The integrated flow field structure of claim 11, wherein the hydrophobic channels and hydrophilic channels comprise graphitic carbon paper.

13. The subassembly of claim 1, further comprising a manifold.

14. The electrochemical cell of claim 1, which is selected from the group consisting of: a fuel cell, electrolyzer, regenerative fuel cell and a chemical sensor.

15. The integrated flow field structure of claim 1, wherein the interlocking configuration is interdigitation.

* * * * *